United States Patent
An et al.

(10) Patent No.: US 10,317,889 B2
(45) Date of Patent: Jun. 11, 2019

(54) WORK-IN-PROCESS MANAGEMENT CONTROL METHOD, WORK-IN-PROCESS MANAGEMENT CONTROL SYSTEM, AND NON-TRANSITORY COMPUTER READABLE STORAGE MEDIUM

(71) Applicants: BOE TECHNOLOGY GROUP CO., LTD., Beijing (CN); CHONGQING BOE OPTOELECTRONICS TECHNOLOGY CO., LTD., Beibei District, Chongqing (CN)

(72) Inventors: Junfeng An, Beijing (CN); Xuanbiao Li, Beijing (CN); Sung Hwan Yoon, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

(*) Notice: Subject to any disclaimer, the term of this patent is extended or adjusted under 35 U.S.C. 154(b) by 122 days.

(21) Appl. No.: 15/681,840

(22) Filed: Aug. 21, 2017

(65) Prior Publication Data
US 2018/0150067 A1  May 31, 2018

(30) Foreign Application Priority Data

Nov. 30, 2016  (CN) .......................... 2016 1 1082984

(51) Int. Cl.
*G05B 19/418* (2006.01)
*G06Q 10/06* (2012.01)

(52) U.S. Cl.
CPC . *G05B 19/41865* (2013.01); *G05B 19/41815* (2013.01); *G05B 19/41835* (2013.01);
(Continued)

(58) Field of Classification Search
CPC ........ G05B 19/41815; G05B 19/41835; G05B 19/41865; G05B 2219/31372;
(Continued)

(56) References Cited

U.S. PATENT DOCUMENTS

| 5,672,044 A * | 9/1997 | Lemelson | B66C 23/00 414/744.3 |
| 10,088,836 B2 * | 10/2018 | Tyber | G05B 19/41865 |
| 2006/0106477 A1 * | 5/2006 | Miyashita | G05B 19/41885 700/103 |

* cited by examiner

*Primary Examiner* — Kenneth M Lo
*Assistant Examiner* — Chad G Erdman
(74) *Attorney, Agent, or Firm* — Ladas & Parry LLP

(57) ABSTRACT

The present disclosure relates to a work-in-process management control method and a work-in-process management control system using the work-in-process management control method. The work-in-process management control method includes: receiving, from first process devices that execute a first process, an out-of-process request for work-in-process; determining whether a second process corresponding to the out-of-process request is a process subjected to control; in the case where the second process is not a process subjected to control, shifting out the work-in-process in response to the out-of-process request; in the case where the second process is a process subjected to control, determining whether a current quantity of the work-in-process in use for the second process exceeds a control threshold in the second process; and in the case where the current quantity of the work-in-process in use for the second process exceeds a control threshold in the second process, stopping responding to the out-of-process request.

17 Claims, 5 Drawing Sheets

(52) U.S. Cl.
CPC ............ *G06Q 10/06311* (2013.01); *G05B 2219/31372* (2013.01); *G05B 2219/32242* (2013.01); *G05B 2219/32254* (2013.01); *Y02P 90/12* (2015.11); *Y02P 90/20* (2015.11)

(58) Field of Classification Search
CPC ........... G05B 2219/32242; G05B 2219/32254; G06Q 10/06311; Y02P 90/12; Y02P 90/20; Y04S 10/54
See application file for complete search history.

WORK-IN-PROCESS MANAGEMENT CONTROL METHOD, WORK-IN-PROCESS MANAGEMENT CONTROL SYSTEM, AND NON-TRANSITORY COMPUTER READABLE STORAGE MEDIUM

CROSS-REFERENCE TO RELATED APPLICATIONS

The present application claims the benefit of priority right of Chinese patent application with the application No. of 201611082984.8, filed on Nov. 30, 2016 in China, which is incorporated by reference herein in its entirety as a portion of the present application.

TECHNICAL FIELD

The present disclosure relates to the field of automatic control, and more particularly to a work-in-process management control method and a work-in-process management control system in an automatic manufacturing environment.

BACKGROUND

In an automatic manufacturing environment, products that are being processed in each manufacturing process and semi-finished products that are waiting for further processing are referred to as work-in-process (WIP). In an actual manufacturing process, unbalance of productivity between previous and subsequent processes is caused due to differences of stability, utilization of process devices in each manufacturing process, as a result, the work-in-process is accumulated in its process devices and related storage devices (e.g., a supply reservoir). Accumulation of a large amount of work-in-process will increase transfer difficulty and cause non-uniform distribution of the work-in-process, even a current supply reservoir to which the process devices pertain has no place to store the work-in-process, which greatly reduces transfer efficiency and affects factory productivity. Besides, accumulation of a large amount of work-in-process is a great waste of production, excessive work-in-process being stored in factories will reduce liquid asset of the manufacturers and affect factory operation and market response sensitivity to a certain extent.

Therefore, it needs to provide a work-in-process management control method in an automatic manufacturing environment and a work-in-process control system using the work-in-process control method, so as to exercise automatic management control over the work-in-process generated in each process in the automatic manufacturing environment, shorten an overall turnaround period of the automatic manufacturing environment, improve transfer efficiency of the work-in-process among the respective process devices, and increase utilization of the process devices, thereby increasing productivity and reducing production waste.

SUMMARY

In view of the above problems, the present disclosure provides a work-in-process management control method in an automatic manufacturing environment and a work-in-process management control system using the work-in-process management control method.

According to an aspect of the present disclosure, there is provided a work-in-process management control method, comprising: receiving, from first process devices that execute a first process, an out-of-process request for work-in-process; determining whether a second process corresponding to the out-of-process request is a process subjected to control; in the case where the second process is not a process subjected to control, shifting out the work-in-process in response to the out-of-process request; in the case where the second process is a process subjected to control, determining whether a current quantity of the work-in-process in use for the second process exceeds a control threshold in the second process; and in the case where the current quantity of the work-in-process in use for the second process exceeds a control threshold in the second process, stopping responding to the out-of-process request.

In the work-in-process management control method provided according to an aspect of the present disclosure, the control threshold is a product of a device quantity of second process devices used to execute the second process and a maximum work-in-process quantity of the work-in-process allocated for each of the second process devices in a corresponding supply reservoir.

In the work-in-process management control method provided according to an aspect of the present disclosure, the current quantity of the work-in-process in use for the second process is a quantity of the work-in-process in use for the second process in the supply reservoir.

In the work-in-process management control method provided according to an aspect of the present disclosure, in the case where a current quantity of the work-in-process in use for the second process does not exceed a control threshold in the second process, the work-in-process management control method further comprises: determining whether a current quantity of the work-in-process in use for a process associated with the second process exceeds a control threshold in the process associated; in the case where a current quantity of the work-in-process in use for a process associated with the second process exceeds a control threshold in the process associated, stopping responding to the out-of-process request.

In the work-in-process management control method provided according to an aspect of the present disclosure, when shifting out the work-in-process in response to the out-of-process request, the work-in-process management control method further comprises: determining whether a storage quantity of the work-in-process in a plurality of supply reservoirs into which the work-in-process is to be shifted reaches a storage threshold; and shifting the work-in-process into a supply reservoir having the smallest storage quantity among the plurality of supply reservoirs in which the storage quantity of the work-in-process does not reach the storage threshold, wherein the storage threshold is a product of a device quantity of the second process devices used to execute the second process and an optimized storage quantity of the work-in-process allocated for each of the second process devices in a corresponding supply reservoir.

According to another aspect of the present disclosure, there is provided a work-in-process management control system, comprising: a plurality of process devices each of which is configured to execute a corresponding process; a work-in-process shifting device configured to execute shifting of work-in-process among the plurality of process devices; a control device configured to control receipt of an out-of-process request from the plurality of process devices, and control the work-in-process shifting device to execute shifting of the work-in-process, wherein the control device receives, from first process devices that execute a first process among the plurality of process devices, an out-of-process request for the work-in-process; the control device determines whether a second process corresponding to the out-of-process request is a process subjected to control; in the case where the second process is not a process subjected to control, the control device controls the work-in-process shifting device to shift out the work-in-process in response to the out-of-process request; in the case where the second process is a process subjected to control, the control device determines whether a current quantity of the work-in-process in use for the second process exceeds a control threshold in the second process; and in the case where the current quantity of the work-in-process in use for the second process exceeds a control threshold in the second process, the control device controls the work-in-process shifting device to stop responding to the out-of-process request.

In the work-in-process management control method provided according to another aspect of the present disclosure, the control threshold is a product of a device quantity of second process devices used to execute the second process and a maximum work-in-process quantity of the work-in-process allocated for each of the second process devices in a corresponding supply reservoir.

In the work-in-process management control method provided according to another aspect of the present disclosure, the current quantity of the work-in-process in use for the second process is a quantity of the work-in-process in use for the second process in the supply reservoir.

In the work-in-process management control method provided according to another aspect of the present disclosure, in the case where a current quantity of the work-in-process in use for the second process does not exceed a control threshold in the second process, the control device further determines whether a current quantity of the work-in-process in use for a process associated with the second process exceeds a control threshold in the process associated, in the case where a current quantity of the work-in-process in use for a process associated with the second process exceeds a control threshold in the process associated, the control device controls the work-in-process shifting device to stop responding to the out-of-process request.

In the work-in-process management control method provided according to another aspect of the present disclosure, when shifting out the work-in-process in response to the out-of-process request, the control device further determines whether a storage quantity of the work-in-process in a plurality of supply reservoirs into which the work-in-process is to be shifted reaches a storage threshold, and the control device controls the work-in-process shifting device to shift the work-in-process into a supply reservoir having the smallest storage quantity among the plurality of supply reservoirs in which the storage quantity of the work-in-process does not reach the storage threshold, wherein the storage threshold is a product of a device quantity of the second process devices used to execute the second process and an optimized storage quantity of the work-in-process allocated for each of the second process devices in a corresponding supply reservoir.

The work-in-process management control method in an automatic manufacturing environment and the work-in-process management control system using the work-in-process control method provided by the present disclosure execute, by means of setting a control threshold in each process and an associated process in respect of work-in-process, management control over a process that exceeds its control threshold, accordingly, it is ensured that the work-in-process of each process is in a balanced level, an overall turnaround period of the automatic manufacturing environment is shortened, transfer efficiency of the work-in-process among the respective process devices is improved, and utilization of the process devices is increased, thereby productivity is increased and production waste is reduced.

It is to be understood that both the foregoing general descriptions and the following detailed descriptions are exemplary and intended to provide further explanations of the claimed technique.

BRIEF DESCRIPTION OF THE DRAWINGS

Through the more detailed description of the embodiments of the present disclosure with reference to the accompanying drawings, the above and other objectives, features, and advantages of the present disclosure will become more apparent. The drawings are to provide further understanding for the embodiments of the present disclosure and constitute a portion of the specification, and are intended to interpret the present disclosure together with the embodiments rather than to limit the present disclosure. In the drawings, the same reference sign generally refers to the same component or step.

DETAILED DESCRIPTION OF THE EMBODIMENTS

To make the objectives, technical solutions, and advantages of the present disclosure more clear, exemplary embodiments of the present disclosure will be described in detail with reference to the accompanying drawings. Obviously, the described embodiments merely are only part of the embodiments of the present disclosure, rather than all of the embodiments of the present disclosure, it should be understood that the present disclosure is not limited to the exemplary embodiments described herein. All other embodiments obtained by those skilled in the art without paying inventive efforts should fall into the protection scope of the present disclosure.

Hereinafter, the embodiments of the present disclosure will be described in detail with reference to the accompanying drawings. First, a work-in-process management control system according to an embodiment of the present disclosure is described with reference to the accompanying drawings.

Figure 1:
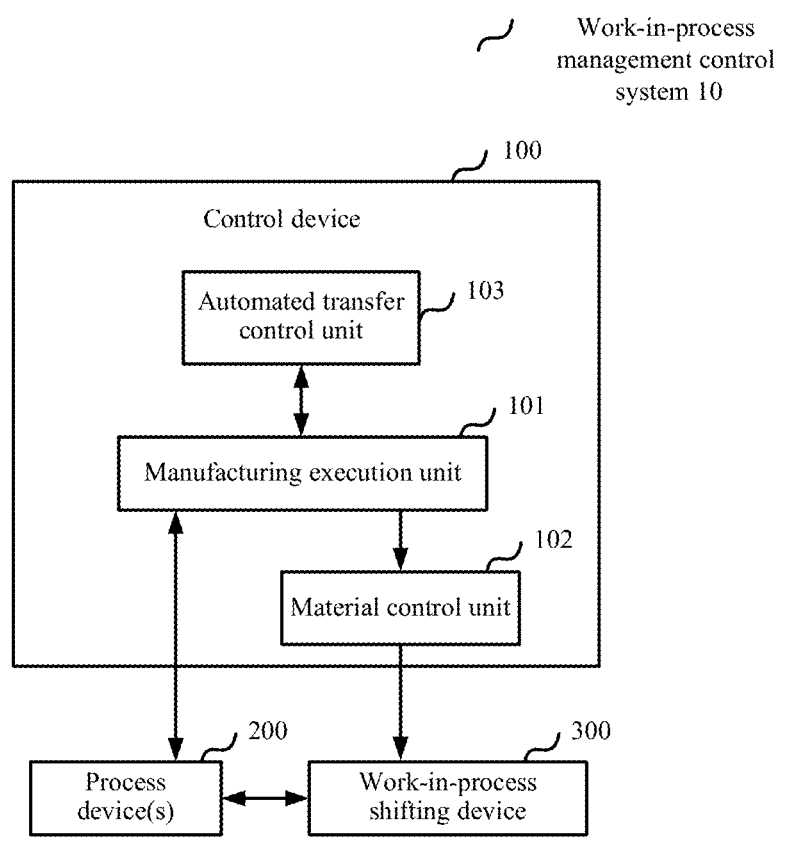
FIG. 1 is a block diagram illustrating a work-in-process management control system according to an embodiment of the present disclosure.

FIG. 1 is a block diagram illustrating a work-in-process management control system according to an embodiment of the present disclosure.

As shown in FIG. 1, the work-in-process management control system 10 according to an embodiment of the present disclosure comprises a control device 100, a plurality of process devices 200, and a work-in-process shifting device 300.

Specifically, each of the plurality of process devices 200 is configured to execute a corresponding process. In an embodiment of the present disclosure, the corresponding process includes, but not limited to, a TFT machining process, a color filter machining process, a unit assembly process, and a module assembly process when the work-in-process management control system is used for manufacturing of a display array.

The work-in-process shifting device 300 is configured to execute shifting of work-in-process among the plurality of process devices. The work-in-process refers to products that are being processed in each manufacturing process and semi-finished products that are waiting for further processing. In an embodiment of the present disclosure, the work-in-process shifting device 300 may be a monorail-supported overhead hoist transfer (OHT) device, or a mechanized ground vehicle (e.g., an automatic guided vehicle (AGV) or a person guided vehicle (PGV)).

The control device 100 is configured to execute the work-in-process management control method according to an embodiment of the present disclosure, that is, the control device controls receipt of an out-of-process request from the plurality of process devices 200, and controls the work-in-process shifting device 300 to execute shifting of the work-in-process.

Further, as shown in FIG. 1, the control device 100 specifically comprises a manufacturing execution unit 101, a material control unit 102, and an automatic transfer control unit 103, respectively. The manufacturing execution unit (MES, manufacturing execution system) 101 receives, for example, a load/unload request from the plurality of process devices 200, and forwards the load/unload request to the automatic transfer control unit 103. The automatic transfer control unit 103 determines whether to respond to the load/unload request based on a preset control strategy and returns reply details (e.g., CST ID/destination) to the manufacturing execution unit 101. The manufacturing execution unit 101 further forwards the returned reply details to the material control unit (MCS, material control system) 102, and the material control unit 102 performs communication with the work-in-process shifting device 300, so as to control the work-in-process shifting device 300 to perform a corresponding load/unload operation based on a reply from the control device 100.

Next, the work-in-process management control method executed by the control device 100 in the work-in-process management control system 10 according to an embodiment of the present disclosure will be further described with reference to the accompanying drawings.

Figure 2:
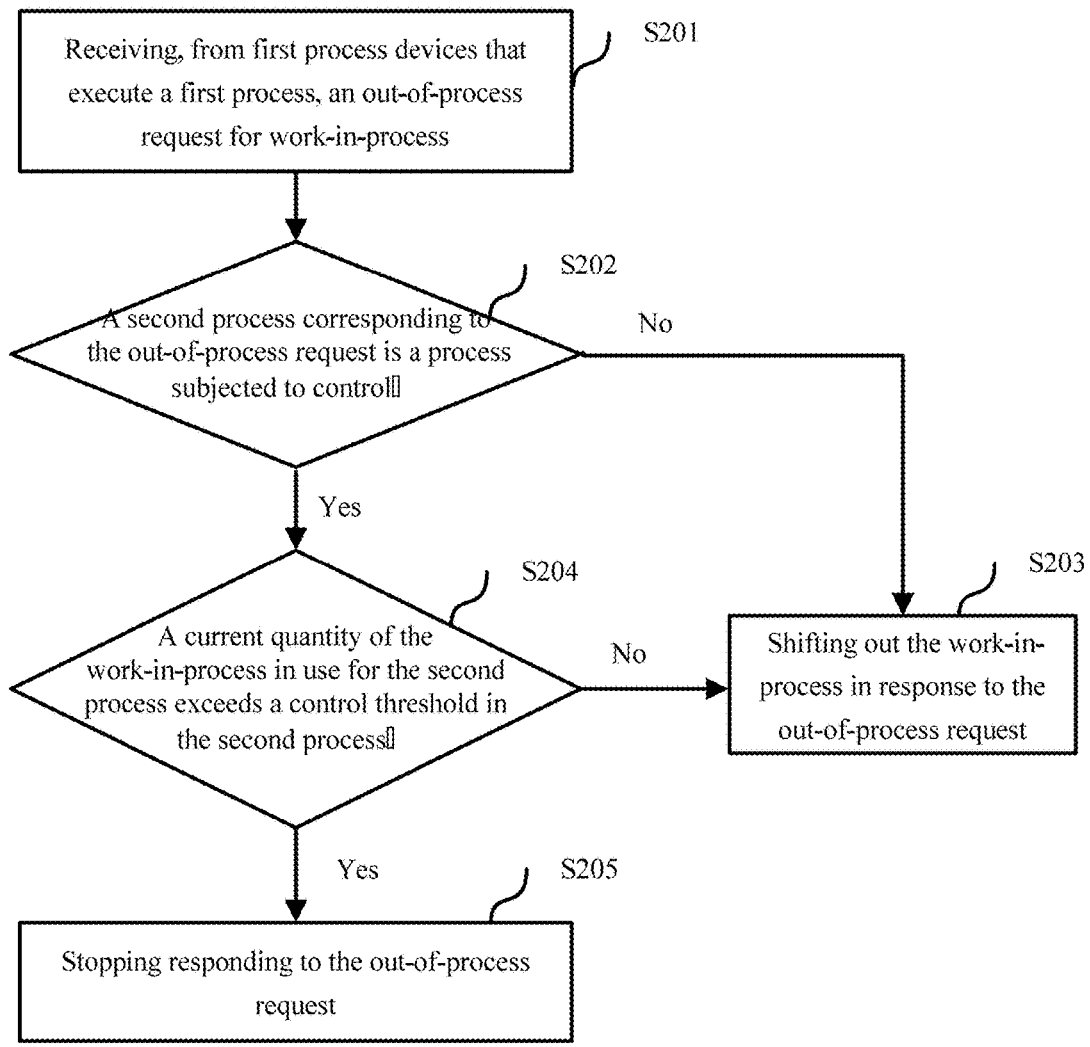
FIG. 2 is a first exemplary flowchart illustrating a work-in-process management control method according to an embodiment of the present disclosure.

FIG. 2 is a first exemplary flowchart illustrating a work-in-process management control method according to an embodiment of the present disclosure. As shown in FIG. 2, a first example of the work-in-process management control method according to an embodiment of the present disclosure comprises the following steps.

At step S201, an out-of-process request for work-in-process is received from first process devices that execute a first process. As described above, the control device 100 receives an out-of-process request for work-in-process from first process devices that execute a first process. Thereafter, the procedure proceeds to step S202.

At step S202, it is determined whether a second process corresponding to the out-of-process request is a process subjected to control.

If a negative result is obtained at step S202, that is, the second process is not a process subjected to control, the procedure proceeds to a non-work-in-process management control step. For example, in an embodiment of the present disclosure, the procedure proceeds to step S203, the work-in-process is shifted out in response to the out-of-process request. That is to say, the control device 100 controls the work-in-process shifting device 300 to shift out the work-in-process.

Contrarily, if a positive result is obtained at step S202, that is, the second process is a process subjected to control, the procedure proceeds to step S204.

At step S204, it is determined whether a current quantity of the work-in-process in use for the second process exceeds a control threshold in the second process. Specifically, how to determine the current quantity of the work-in-process in use for the second process and the control threshold will be further described below.

In an embodiment of the present disclosure, the control threshold is a product of a device quantity of second process devices used to execute the second process and a maximum work-in-process quantity of the work-in-process allocated for each of the second process devices in a corresponding supply reservoir. Since the quantity of process devices scheduled by the control device for a certain process is dynamic and storage space of the supply reservoir to which the process devices pertain also is dynamic, the two both need to be considered when setting the control threshold.

For example, it is assumed that the process subjected to control has a code A, an upper limit of the control threshold in process A is represented by La. It is assumed that the quantity of the process devices that are executing process A in the supply reservoir to which the process devices pertain is Qi, i is a serial number of the supply reservoir; it is assumed that a maximum quantity of the work-in-process in use for process A as stored in the supply reservoir in respect of one process device is Wi, i is a serial number of the supply reservoir, the upper limit La of the control threshold in process A is represented as $$La = \sum_{i=1}^{n} Qi \times Wi \qquad \text{Expression 1}$$

The upper limit of the control threshold in a process as represented by the above expression 1 is a sum of products obtained by multiplying a quantity of available process devices within all the supply reservoirs with a quantity that can be stored in the supply reservoirs in respect of one process device. The calculation method of the upper limit of the control threshold reflects both dynamical changes of the respective process devices and also storage space differences of the respective supply reservoirs.

In an embodiment of the present disclosure, the current number of the work-in-process in use for the second process is the quantity of the work-in-process in use for the second process in the supply reservoir. The work-in-process may include two sections, product in wait and product being run, according to states. The work-in-process may be divided as those at an unload port of a process device for a previous process, those within the supply reservoirs, and those at a load port of a process device for a current process according to a current location. The reasonably optical method of calculating the current quantity of the work-in-process is to calculate only the quantity of the work-in-process in the supply reservoir, excluding the work-in-process at the process devices for a previous process (i.e., the first process devices) and the work-in-process at the process device for a current process (i.e., the second process devices).

If calculation of the current work-in-process quantity comprises all the work-in-process in a wait state, when the process devices that execute a previous process stop loading material during a first occurrence of management control over the work-in-process, the process devices would not stop manufacturing immediately, because one process device will have 4 to 6 ports, one process generally has 3 to 4 process devices. It is assumed that an upper limit of the control threshold in one process in respect of the work-in-process is 30, during a first occurrence of management control over the work-in-process, the current work-in-process quantity is 30, the process devices for the previous process may continue to manufacture, the process devices for the subsequent process are always slower than the process devices for the previous process because of device shut down, accordingly, after the current work-in-process quantity reaches 30, accumulation continues because of the problem at the subsequent process until all the ports are stacked with the work-in-process and there is no way to unload, the final work-in-process quantity is 30 plus the number of ports of the process devices. It is assumed that there are 24 ports at the process devices for the previous process in total, the final work-in-process quantity is 54. After the problem at the subsequent process is solved and production is restored, the work-in-process quantity starts to decline until it drops to 30, then shifting out from the process devices for the previous process will start. In this case, there will be two problems: the first problem is the work-in-process quantity within the supply reservoir is only 6, the rest of the work-in-process all is at the process devices for the previous process, here probably because of a long distance between the process devices for the previous process and the process devices for the subsequent process, load requirements of the process devices for the subsequent process devices cannot be met, there is idleness because of a long transfer time; the second problem is when the current work-in-process quantity reaches 30, shifting out may be executed at all the ports of the process devices for the previous process, dozens of transfer needs come into being instantly, this will also cause a transfer command blockage, and affect the overall operation.

Therefore, in the embodiment of the present disclosure, only the work-in-process in the supply reservoir is calculated to determine whether the upper limit of the control threshold is exceeded, it is possible to enter work-in-process management control faster through change of the work-in-process in a previous process and a subsequent process, and release work-in-process control earlier, so that a time point of exercising management control is advanced and rhythm change of exercising management control is faster, so as to avoid transfer command concentration caused by late time management control and unnecessary idleness caused by a small quantity of reasonably distributed work-in-process.

If a positive result is obtained at S204, that is, the current quantity of the work-in-process in use for the second process exceeds a control threshold in the second process, the procedure proceeds to step S205. At step S205, it stops responding to the out-of-process request. That is to say, the control device 100 controls the work-in-process shifting device 300 to stop responding to the out-of-process request, so as to exercise management control over the second process.

If a negative result is obtained at S204, that is, the current quantity of the work-in-process in use for the second process does not exceed a control threshold in the second process, the procedure proceeds to step S203. As described above, at step S203, the work-in-process is shifted out in response to the out-of-process request.

In the first example of the work-in-process management control method according to an embodiment of the present disclosure as described above with reference to FIG. 2, by means of determining whether the current work-in-process quantity exceeds a control threshold determined based on dynamic changes of the respective process devices and dynamic differences of storage space of the respective supply reservoirs, management control is initialized when the current work-in-process quantity exceeds the control threshold, thus ensuring the work-in-process for the respective processes is in a balanced level, improving transfer efficiency of the work-in-process among the respective process devices, and improving utilization of the process devices.

Figure 3:
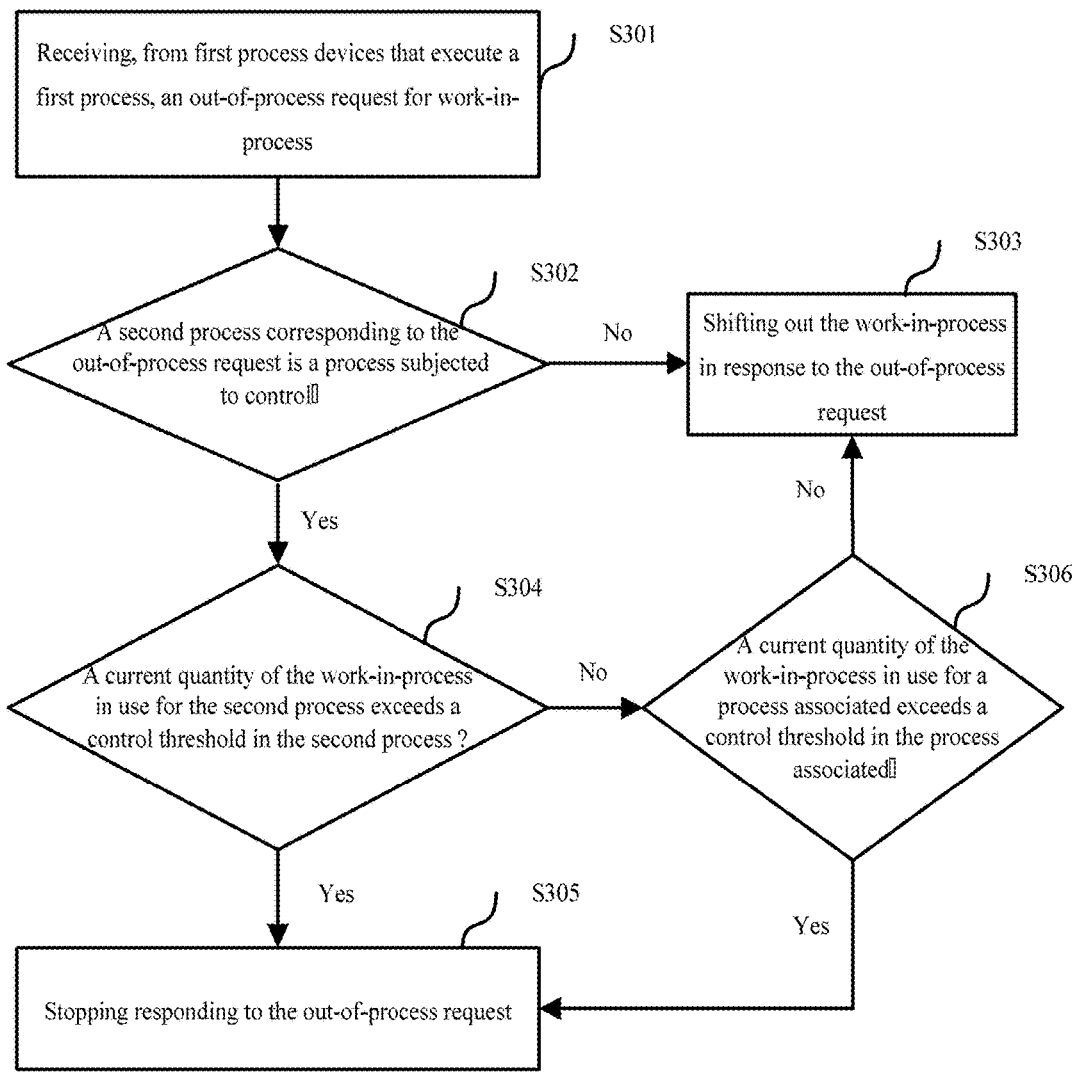
FIG. 3 is a second exemplary flowchart further illustrating a work-in-process management control method according to an embodiment of the present disclosure.

FIG. 3 further illustrates a second exemplary flowchart further illustrating a work-in-process management control method according to an embodiment of the present disclosure. A second example of the work-in-process management control method according to an embodiment of the present disclosure as shown in FIG. 3 differs from the first example of the work-in-process management control method according to an embodiment of the present disclosure as shown in FIG. 2 in: the management control process further considers associated management control over an associated process.

Steps 301 to 305 as shown in FIG. 3 are the same as steps S201 to S205 as shown in FIG. 2, respectively, repeated descriptions are omitted here. Different from directly responding to the out-of-process request in the case where the current quantity of the work-in-process in use for the second process does not exceed a control threshold in the second process, the second example of the work-in-process management control method according to an embodiment of the present disclosure as shown in FIG. 3 proceeds to step S306 after a negative result is obtained at step S304.

At step S306, it is further determined whether a current quantity of the work-in-process in use for a process associated with the second process exceeds a control threshold in the process associated. The work-in-process management control in the first example of the work-in-process management control method according to an embodiment of the present disclosure as shown in FIG. 2 exercises management control through the previous process and the subsequent process, if it is desired to reflect the control at an input port, it needs to derive from a subsequent process one by one, the work-in-process management control may probably occur within a large segment of processing intervals when management control is exercised at the input port/when the management control is launched, and the overall quantity of the work-in-process also goes beyond a range that can be accepted by the supply reservoir.

If a positive result is obtained at step S306, that is, a current quantity of the work-in-process in use for a process associated with the second process exceeds a control threshold in the process associated, the procedure proceeds to step S305. At step S305, it stops responding to the out-of-process request. Contrarily, if a negative result is obtained at step S306, that is, a current quantity of the work-in-process in use for a process associated with the second process does not exceed a control threshold in the process associated, the procedure proceeds to step S303. As described above, the work-in-process is shifted out in response to the out-of-process request at step S303.

Therefore, the second example of the work-in-process management control method according to an embodiment of the present disclosure further considers associated management control, that is, the associated management control is exercised through a certain bottleneck procedure associated with a certain previous process, which means that the management control oversees whether the work-in-process of the current process exceeds an upper limit, meanwhile it also determines whether the work-in-process of the associated process exceeds an upper limit. The aim of quickly controlling excessive input is achieved through the bottleneck procedure.

Figure 4:
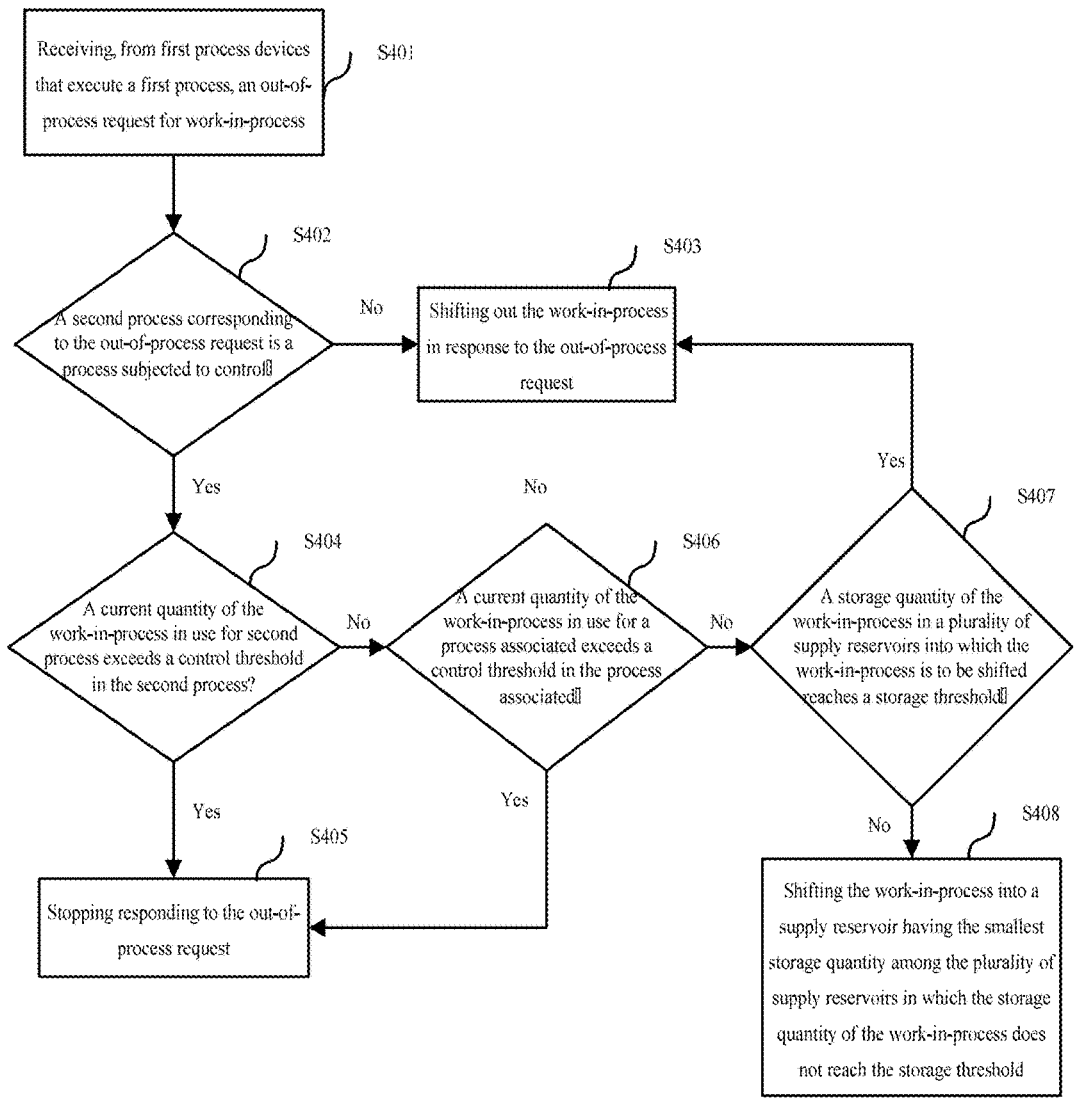
FIG. 4 is a third exemplary flowchart further illustrating a work-in-process management control method according to an embodiment of the present disclosure.

FIG. 4 is a third exemplary flowchart further illustrating a work-in-process management control method according to an embodiment of the present disclosure. A third example of the work-in-process management control method according to an embodiment of the present disclosure as shown in FIG. 4 differs from the second example of the work-in-process management control method according to an embodiment of the present disclosure as shown in FIG. 3 in: the management control method further considers a storage upper limit in each supply reservoir in respect of the work-in-process and the quantity of the work-in-process for the current process in a current supply reservoir, and thereby exercising corresponding transfer control.

Steps 401 to 406 as shown in FIG. 4 are the same as steps S301 to S305 as shown in FIG. 3, respectively, repeated descriptions are omitted here. Different from directly responding to the out-of-process request in the case where the current quantity of the work-in-process in use for the second process does not exceed a control threshold in the second process, the third example of the work-in-process management control method according to an embodiment of the present disclosure as shown in FIG. 4 proceeds to step S407 after a negative result is obtained at step S406.

At step S407, it is further determined whether a storage quantity of the work-in-process in a plurality of supply reservoirs into which the work-in-process is to be shifted reaches a storage threshold.

If a positive result is obtained at step S407, that is, a storage quantity of the work-in-process in a plurality of supply reservoirs into which the work-in-process is to be shifted reaches a storage threshold, the procedure proceeds to step S403. At step S403, the work-in-process is shifted out in response to the out-of-process request, and the shifting out procedure is a non-management control procedure.

Contrarily, if a negative result is obtained at step S407, that is, a storage quantity of the work-in-process in a plurality of supply reservoirs into which the work-in-process is to be shifted does not reach a storage threshold, the procedure proceeds to step S408. At step S408, the work-in-process is shifted into a supply reservoir having the smallest storage quantity among the plurality of supply reservoirs in which the storage quantity of the work-in-process does not reach the storage threshold. In an embodiment of the present disclosure, the storage threshold is a product of a device quantity of the second process devices used to execute the second process and an optimized storage quantity of the work-in-process allocated for each of the second process devices in a corresponding supply reservoir.

Therefore, the third embodiment of the work-in-process management control method according to an embodiment of the present disclosure as shown in FIG. 4 further considers the storage upper limit of the work-in-process in each supply reservoir and the current quantity of the work-in-process for a process in the supply reservoir, and thereby exercising corresponding transfer control. That is to say, according to an arrangement of sorting from the lowest required quantity to the highest required quantity of the respective supply reservoirs, the work-in-process is transferred preferentially to a supply reservoir having a larger requirement, if the work-in-process within the respective supply reservoirs has already reached a required quantity, it enters a non-work-in-process management control procedure to transfer.

Figure 5:
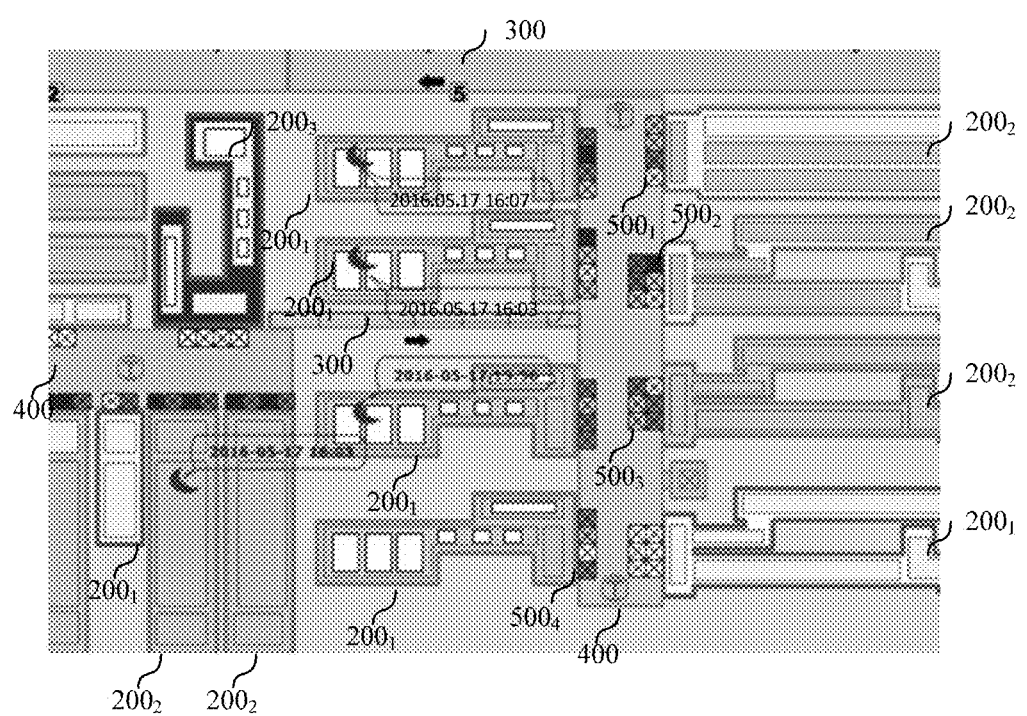
FIG. 5 is a schematic diagram illustrating management control exercised by adopting the work-in-process management control method according to an embodiment of the present disclosure.

FIG. 5 is a schematic diagram illustrating management control exercised by adopting the work-in-process management control method according to an embodiment of the present disclosure. As shown in FIG. 5, the work-in-process shifting device 300 is used to execute shifting of work-in-process among the plurality of process devices 200. Specifically, different filling line types represent the process devices 200 in different states. For example, the process devices 200 include a process device $200_1$ in an idle state, a process device $200_2$ in an operating state, and a process device $200_3$ in a maintaining state. In addition, there is a supply reservoir 400 used to store the work-in-process for the respective process devices 200. Each process device has a port 500 used to shift out the work-in-process into the work-in-process shifting device 300 and the supply reservoir 400. Specifically, a different grayscale represents a state of the port 500. The port 500 includes, for example, a port $500_1$ in an idle state, a port $500_2$ in a problem state, a port $500_3$ in an upwardly loaded state, and a port $500_4$ in a downwardly loaded state.

Specifically, when the work-in-process is under management control, it will be displayed in the form of a meniscus at a state monitoring interface to facilitate an operator learning the reasons why the work-in-process cannot be unloaded, meanwhile the time of control will also be shown, to facilitate the operator analyzing problem and making judgment.

The work-in-process management control method in an automatic manufacturing environment and the work-in-process management control system using the work-in-process control method provided by the present disclosure execute, by means of setting a control threshold in each process and an associated process in respect of work-in-process, management control over a process that exceeds its control threshold, accordingly, it is ensured that the work-in-process of each process is in a balanced level, an overall turnaround period of the automatic manufacturing environment is shortened, transfer efficiency of the work-in-process among the respective process devices is improved, and utilization of the process devices is increased, thereby productivity is increased and production waste is reduced.

It should be noted that, in the specification, the terms "comprise", "include" and any other variations thereof intend to cover nonexclusive inclusion so that the procedure, the method, the product or the equipment including a series of elements include not only these elements, but also other elements which are not listed explicitly, or also include inherent elements of these procedure, method, product or equipment. In the case that there is no further limitation, elements defined by the expressions "comprise one . . . " do not exclude there being additional identity elements in the procedure, method, product or equipment of the elements.

Finally, it should be noted that, the above-described series of processes do not only comprise processes executed chronologically in the order mentioned here, and also comprise processes executed in parallel or individually but not chronologically.

Through the above description of the implementations, a person skilled in the art can clearly understand that the present disclosure may be implemented in a manner of software plus a necessary hardware platform, and of course the present disclosure may also be implemented fully by hardware. Based on such understanding, the technical solution of the present disclosure that contributes to the background art may be embodied in whole or in part in the form of a software product. The computer software product may be stored in a storage medium, such as ROM/RAM, disk, CD-ROM, and include several instructions for causing a computer apparatus (which may be a personal computer, a server, or a network device) to perform the method described in the various embodiments of the present disclosure or certain parts thereof.

Although the present disclosure has been described in detail in the above, specific examples are applied in this text to demonstrate the principles and implementations of the present disclosure, these descriptions of the above embodiments are only to help understand the method of the present disclosure and its core concept. Meanwhile, for a person with ordinary skill in the art, depending on the concepts of the present disclosure, modifications may be made to the specific implementations and applications. To sum up, contents of this specification should not be construed as limiting the present disclosure.

What is claimed is:

1. A work-in-process management control method, comprising:
    receiving, from first process devices that execute a first process, an out-of-process request for work-in-process;
    determining whether a second process corresponding to the out-of-process request is a process subjected to control;
    in the case where the second process is not a process subjected to control, shifting out the work-in-process in response to the out-of-process request;
    in the case where the second process is a process subjected to control, determining whether a current quantity of the work-in-process in use for the second process exceeds a control threshold in the second process; and
    in the case where the current quantity of the work-in-process in use for the second process exceeds a control threshold in the second process, stopping responding to the out-of-process request.

2. The work-in-process management control method according to claim 1, wherein the control threshold is a product of a device quantity of second process devices used to execute the second process and a maximum work-in-process quantity of the work-in-process allocated for each of the second process devices in a corresponding supply reservoir.

3. The work-in-process management control method according to claim 1, wherein the current quantity of the work-in-process in use for the second process is a quantity of the work-in-process in use for the second process in the supply reservoir.

4. The work-in-process management control method according to claim 2, wherein the current quantity of the work-in-process in use for the second process is a quantity of the work-in-process in use for the second process in the supply reservoir.

5. The work-in-process management control method according to claim 1, wherein in the case where a current quantity of the work-in-process in use for the second process does not exceed a control threshold in the second process, the work-in-process management control method further comprises:
    determining whether a current quantity of the work-in-process in use for a process associated with the second process exceeds a control threshold in the process associated,
    in the case where a current quantity of the work-in-process in use for a process associated with the second process exceeds a control threshold in the process associated, stopping responding to the out-of-process request.

6. The work-in-process management control method according to claim 2, wherein in the case where a current quantity of the work-in-process in use for the second process does not exceed a control threshold, the work-in-process management control method further comprises:
    determining whether a current quantity of the work-in-process in use for a process associated with the second process exceeds a control threshold in the process associated,
    in the case where a current quantity of the work-in-process in use for a process associated with the second process exceeds a control threshold in the process associated, stopping responding to the out-of-process request.

7. The work-in-process management control method according to claim 1, wherein when shifting out the work-in-process in response to the out-of-process request, the work-in-process management control method further comprises:
    determining whether a storage quantity of the work-in-process in a plurality of supply reservoirs into which the work-in-process is to be shifted reaches a storage threshold, and
    shifting the work-in-process into a supply reservoir having the smallest storage quantity among the plurality of supply reservoirs in which the storage quantity of the work-in-process does not reach the storage threshold,
    wherein the storage threshold is a product of a device quantity of the second process devices used to execute the second process and an optimized storage quantity of the work-in-process allocated for each of the second process devices in a corresponding supply reservoir.

8. The work-in-process management control method according to claim 2, wherein when shifting out the work-in-process in response to the out-of-process request, the work-in-process management control method further comprises:
    determining whether a storage quantity of the work-in-process in a plurality of supply reservoirs into which the work-in-process is to be shifted reaches a storage threshold, and
    shifting the work-in-process into a supply reservoir having the smallest storage quantity among the plurality of supply reservoirs in which the storage quantity of the work-in-process does not reach the storage threshold,
    wherein the storage threshold is a product of a device quantity of the second process devices used to execute the second process and an optimized storage quantity of the work-in-process allocated for each of the second process devices in a corresponding supply reservoir.

9. A work-in-process management control system, comprising:
    a plurality of process devices each of which is configured to execute a corresponding process;
    a work-in-process shifting device configured to execute shifting of work-in-process among the plurality of process devices;
    a control device configured to control receipt of an out-of-process request from the plurality of process devices, and control the work-in-process shifting device to execute shifting of the work-in-process, wherein the control device receives, from first process devices that execute a first process among the plurality of process devices, an out-of-process request for the work-in-process;

the control device determines whether a second process corresponding to the out-of-process request is a process subjected to control;

in the case where the second process is not a process subjected to control, the control device controls the work-in-process shifting device to shift out the work-in-process in response to the out-of-process request;

in the case where the second process is a process subjected to control, the control device determines whether a current quantity of the work-in-process in use for the second process exceeds a control threshold in the second process; and in the case where the current quantity of the work-in-process in use for the second process exceeds a control threshold in the second process, the control device controls the work-in-process shifting device to stop responding to the out-of-process request.

10. The work-in-process management control system according to claim 9, wherein the control threshold is a product of a device quantity of second process devices used to execute the second process and a maximum work-in-process quantity of the work-in-process allocated for each of the second process devices in a corresponding supply reservoir.

11. The work-in-process management control system according to claim 9, wherein the current quantity of the work-in-process in use for the second process is a quantity of the work-in-process in use for the second process in the supply reservoir.

12. The work-in-process management control system according to claim 10, wherein the current quantity of the work-in-process in use for the second process is a quantity of the work-in-process in use for the second process in the supply reservoir.

13. The work-in-process management control system according to claim 9, wherein in the case where a current quantity of the work-in-process in use for the second process does not exceed a control threshold in the second process, the control device further determines whether a current quantity of the work-in-process in use for a process associated with the second process exceeds a control threshold in the process associated, in the case where a current quantity of the work-in-process in use for a process associated with the second process exceeds a control threshold in the process associated, the control device controls the work-in-process shifting device to stop responding to the out-of-process request.

14. The work-in-process management control system according to claim 10, wherein in the case where a current quantity of the work-in-process in use for the second process does not exceed a control threshold in the second process, the control device further determines whether a current quantity of the work-in-process in use for a process associated with the second process exceeds a control threshold in the process associated, in the case where a current quantity of the work-in-process in use for a process associated with the second process exceeds a control threshold in the process associated, the control device controls the work-in-process shifting device to stop responding to the out-of-process request.

15. The work-in-process management control system according to claim 9, wherein when shifting out the work-in-process in response to the out-of-process request, the control device further determines whether a storage quantity of the work-in-process in a plurality of supply reservoirs into which the work-in-process is to be shifted reaches a storage threshold, and the control device controls the work-in-process shifting device to shift the work-in-process into a supply reservoir having the smallest storage quantity among the plurality of supply reservoirs in which the storage quantity of the work-in-process does not reach the storage threshold, wherein the storage threshold is a product of a device quantity of the second process devices used to execute the second process and an optimized storage quantity of the work-in-process allocated for each of the second process devices in a corresponding supply reservoir.

16. The work-in-process management control system according to claim 10, wherein when shifting the work-in-process in response to the out-of-process request, the control device further determines whether a storage quantity of the work-in-process in a plurality of supply reservoirs into which the work-in-process is to be shifted reaches a storage threshold, and the control device controls the work-in-process shifting device to shift the work-in-process into a supply reservoir having the smallest storage quantity among the plurality of supply reservoirs in which the storage quantity of the work-in-process does not reach the storage threshold, wherein the storage threshold is a product of a device quantity of the second process devices used to execute the second process and an optimized storage quantity of the work-in-process allocated for each second process devices in a corresponding supply reservoir.

17. A non-transitory computer readable storage medium on which computer program instructions which enable a computer to execute a work-in-process management control method when being executed by the computer are stored, the work-in-process management control method comprising receiving, from first process devices that execute a first process, an out-of-process request for work-in-process;

determining whether a second process corresponding to the out-of-process request is a process subjected to control;

in the case where the second process is not a process subjected to control, shifting the work-in-process in response to the out-of-process request;

in the case where the second process is a process subjected to control, determining whether a current quantity of the work-in-process in use for the second process exceeds a control threshold in the second process; and in the case where the current quantity of the work-in-process in use for the second process exceeds a control threshold in the second process, stopping responding to the out-of-process request.

* * * * *